United States Patent
Allen

(10) Patent No.: US 9,632,823 B1
(45) Date of Patent: Apr. 25, 2017

(54) MULTITHREADED APPLICATION THREAD SCHEDULE SELECTION

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 14/480,184

(22) Filed: Sep. 8, 2014

(51) Int. Cl.
*G06F 9/46* (2006.01)
*G06F 9/48* (2006.01)

(52) U.S. Cl.
CPC .................................. *G06F 9/4843* (2013.01)

(58) Field of Classification Search
None
See application file for complete search history.

(56) References Cited

U.S. PATENT DOCUMENTS

| | | | | |
|---|---|---|---|---|
| 6,658,490 B1 * | 12/2003 | Williams | .............. | G06F 9/4812 718/100 |
| 2006/0112390 A1 * | 5/2006 | Hamaoka | .............. | G06F 9/5066 718/102 |
| 2009/0183157 A1 * | 7/2009 | Tran | .............. | G06F 1/3203 718/100 |
| 2011/0154353 A1 * | 6/2011 | Theroux | .............. | G06F 9/5038 718/104 |
| 2011/0161964 A1 * | 6/2011 | Piazza | .............. | G06F 9/4881 718/102 |
| 2015/0106819 A1 * | 4/2015 | Kim | .............. | G06F 9/5038 718/103 |
| 2015/0160970 A1 * | 6/2015 | Nugteren | .............. | G06F 8/451 718/102 |

* cited by examiner

*Primary Examiner* — H S Sough
*Assistant Examiner* — Timothy Duncan
(74) *Attorney, Agent, or Firm* — Davis Wright Tremaine LLP

(57) ABSTRACT

A method and apparatus for multithreaded application thread schedule selection are disclosed. In the method and apparatus a thread execution schedule for executing an application is selected from a plurality of thread execution schedules, whereby the selection is based at least in part on an identity associated with the application and an identity associated with one or more inputs to the application. The application is then executed in accordance with the thread execution schedule and execution status information is stored as a result of execution of the application.

20 Claims, 8 Drawing Sheets

MULTITHREADED APPLICATION THREAD SCHEDULE SELECTION

BACKGROUND

In datacenters as well as many other computing applications, it is important to ensure consistency and efficiency in executing multithreaded applications that have concurrent execution threads. The execution time and performance of a multithreaded application may vary due at least in part to differences between computing platforms used to execute the multithreaded application. For example, differences between operating systems and underlying computing devices may result in different execution times and often unpredictable outcomes in terms of whether the multithreaded application is successfully executed. In addition, because applications can have varying data inputs, difference between the data inputs propagate along the execution paths of the applications and contribute to the observed performance inconsistencies.

It is often challenging to select appropriate thread execution schedules for ensuring efficiency and consistency in executing a multithreaded application. Further, it is also challenging to construct and maintain a database of thread execution schedules that are usable for executing different applications having different data inputs.

BRIEF DESCRIPTION OF THE DRAWINGS

Various embodiments in accordance with the present disclosure will be described with reference to the drawings, in which.

DETAILED DESCRIPTION

Figure 1:
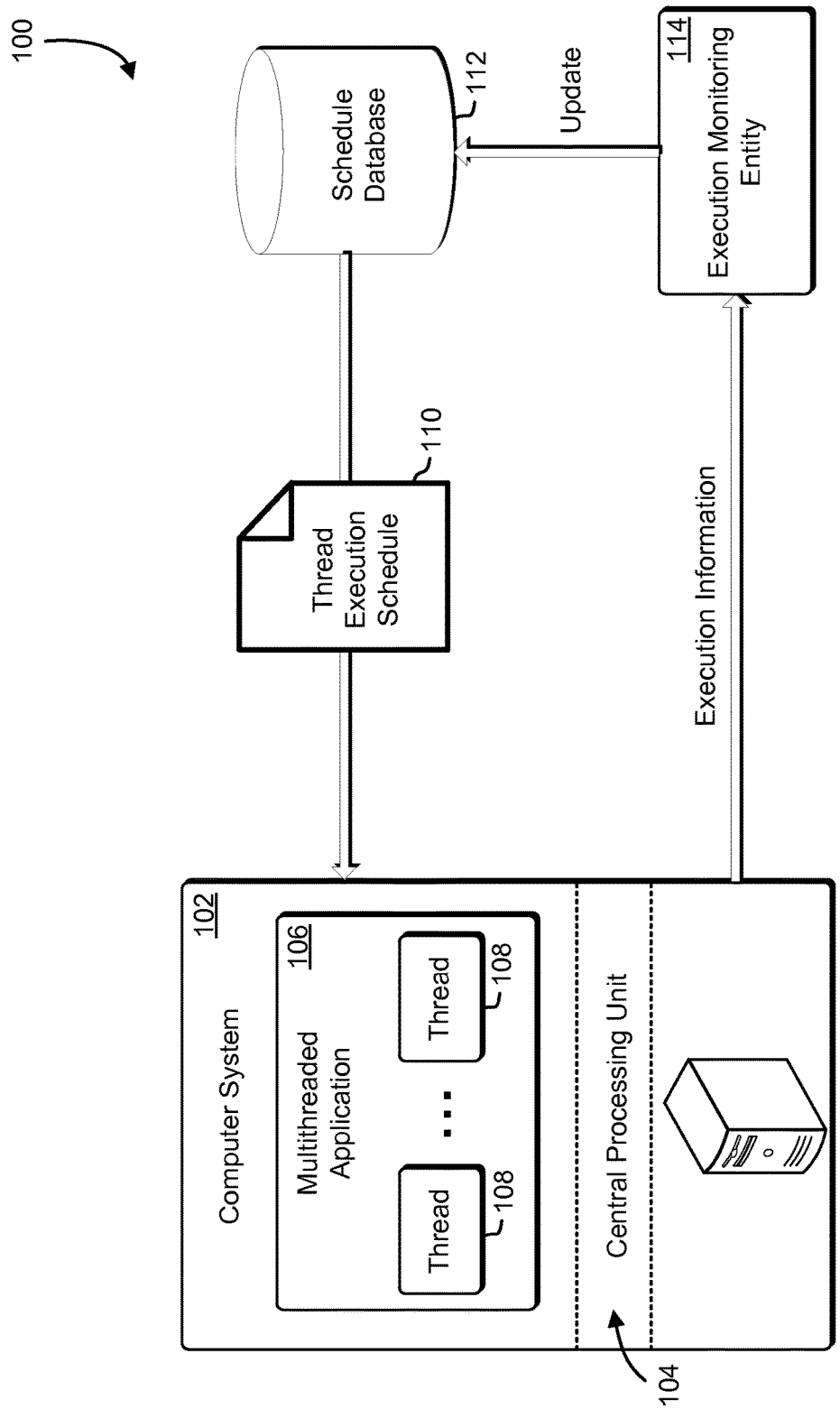
FIG. 1 shows an example of an environment for executing a multithreaded application in accordance with a thread execution schedule in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include constructing a database of thread execution schedules and selecting, from the database, a thread execution schedule for executing a multithreaded application. A multithreaded application may be a computer program that has a plurality of concurrent execution threads (also known as execution flows), whereby each concurrent thread may include a plurality of executable instructions. The use of multithreading enables efficient application execution and minimizes idle time. For example, while execution of one thread of an application may become idle, the computing resources may be used for executing another thread of the application or a portion (i.e., instructions) thereof. An execution schedule may specify constraints on the execution of the multithreaded application. The schedule may specify conditions for switching between the execution of application threads (also referred to as context switching). The schedule may also specify an ordering of the execution of the instructions of the application. Further, the schedule may specify timeout conditions for the instructions of the application, whereby one or more actions may be performed if an instruction of an application thread is not executed in a certain amount of time.

Executing a multithreaded application in accordance with a pre-specified thread execution schedule is advantageous as it reduces execution performance variability. If an execution schedule is unspecified, the execution time of an application (and, generally, execution performance) is more likely to vary depending on the computer system executing the application. Further, variability may be observed depending upon the inputs associated with the application, whereby the application inputs may be any data used in executing the application including operand data, among others.

A schedule database may be used to store thread execution schedules. Each thread execution schedule that is stored in the database may be associated with an identity of a multithreaded application and/or an identity of one or more inputs to the multithreaded application. The thread execution schedule may be usable for executing the multithreaded application having the identified one or more inputs. Further, the thread execution schedule may be associated with a fitness measure that is indicative of observed execution performance of the thread execution schedule. The fitness measure, which may be a numeric score, among others, may be a function of whether usage of the thread execution schedule has been observed to result in successful execution of the application or associated instructions. Further, the fitness measure may be a function of the number or size of a set of application inputs for which the execution schedule may be suitable. Further, the fitness measure may be a function of an execution time of the application or associated instructions. The fitness measure may be a score that is used to influence the probability of further selection of the thread execution schedule for executing an application. For example, the fitness measure may be used to positively bias selection of the thread execution schedule for application execution when favorable execution performance is observed (for example, historically) and vice-versa.

Upon receiving a multithreaded application for execution by a computer system (for example, a computer system that is part of a datacenter), the inputs associated with the application may be identified. Further, the schedule database may be consulted to identify thread execution schedules suitable for an application and application inputs pair. A thread execution schedule of the identified schedules may be selected based at least in part on the schedule's fitness measure or the fitness measure of other schedules stored in the database. In addition, the application may be sent for execution on the computer system in accordance with the selected schedule. The execution of the application may be monitored to identify whether the application or associated instructions were successfully executed and to identify execution times associated with the application or instructions, among others. For example, data indicating the application performance results may be received from an operating system or a central processing unit (CPU) of the computer system. The fitness measure of the thread execution schedule may be updated in accordance with the monitoring. For example, execution failures may weigh negatively on the fitness measure, whereas expeditious execution of the instructions or efficient use of input/output (I/O) or networking resources may weigh positively on the fitness measure. The updated fitness measure may be evaluated for subsequent assignment of the execution schedules at hand or other execution schedules retained in the schedule database.

The schedule database may be populated based at least in part on observed execution performance of applications using execution schedules. For example, to populate the schedule database, an application may be caused to be executed using free threading of a computer system. As used herein, free threading refers to the native capability of certain operating systems and CPUs to assign execution schedules to applications based at least in part on a configured algorithm. The execution of the multithreaded application may be monitored, whereby the stages of the execution of the application may be traced. Further, based at least in part on tracing the execution and the monitoring the performance of the application, new thread execution schedules may be introduced. Further, thread execution schedule discovery may involve mutating or combing existing thread execution schedules with or without free threading to produce new thread execution schedules. Further, as the size of the database grows, pruning is performed to reduce the size of the database and render the database efficient and manageable. For example, less optimum thread execution schedules may be discarded, while optimum and well performing thread execution schedules may be retained.

FIG. 1 shows an example of an environment for executing a multithreaded application in accordance with a thread execution schedule in accordance with at least one embodiment. In the environment 100, a computer system 102 is provided. The computer system 102 may be a server or host, among others. Further, the computer system 102 has a central processing unit 104 that has an associated execution thread, whereby, for example, the central processing unit 104 may be a single-threaded central processing unit. A multithreaded application 106 comprising a plurality of execution threads 108 is provided to the computer system 102 for execution, whereby each execution thread 108 may include a plurality of executable instructions. A thread schedule 110 is selected from a schedule database 112 and used for executing the multithreaded application 106. The thread schedule 100 may govern the timing or order of execution of the instructions of the multithreaded application 106 on the central processing unit 104. The central processing unit 104 may be configured to execute one thread 108 of the application 106 at a time, and the thread schedule 100 may specify the timing or order of the execution of the application threads 108 on the central processing unit 104. For example, the thread schedule 110 may be a deterministic sequence of instructions for execution by the computer system 102. The schedule database 112 may include one or more thread schedules, whereby the thread schedule 110 may be selected from the schedule database 112 based at least in part on the fitness (as measured by a fitness measure) of the thread schedule 110 for use to execute the application 106.

After providing the application 106 to the computer system 102 for execution, the application is executed on the computer system 102 and the execution of the application 106 is monitored by an execution monitoring entity 114. The execution monitoring entity 114 may receive execution information that may provide details about the execution of the application 106 including the manner of performing thread switching or instructions ordering. Further, the execution information may indicate the performance of execution of the application 106 using the thread execution schedule 110. The execution information may be used to update the schedule database 112. For example, reported execution failures may be used to bias against further selection of the thread execution schedule 110 for executing the same or similar applications. Furthermore, favorable aspects of the employed execution schedule may be identified and incorporated in stored thread execution schedules or new thread execution schedules that are introduced to the schedule database 112.

Figure 2:
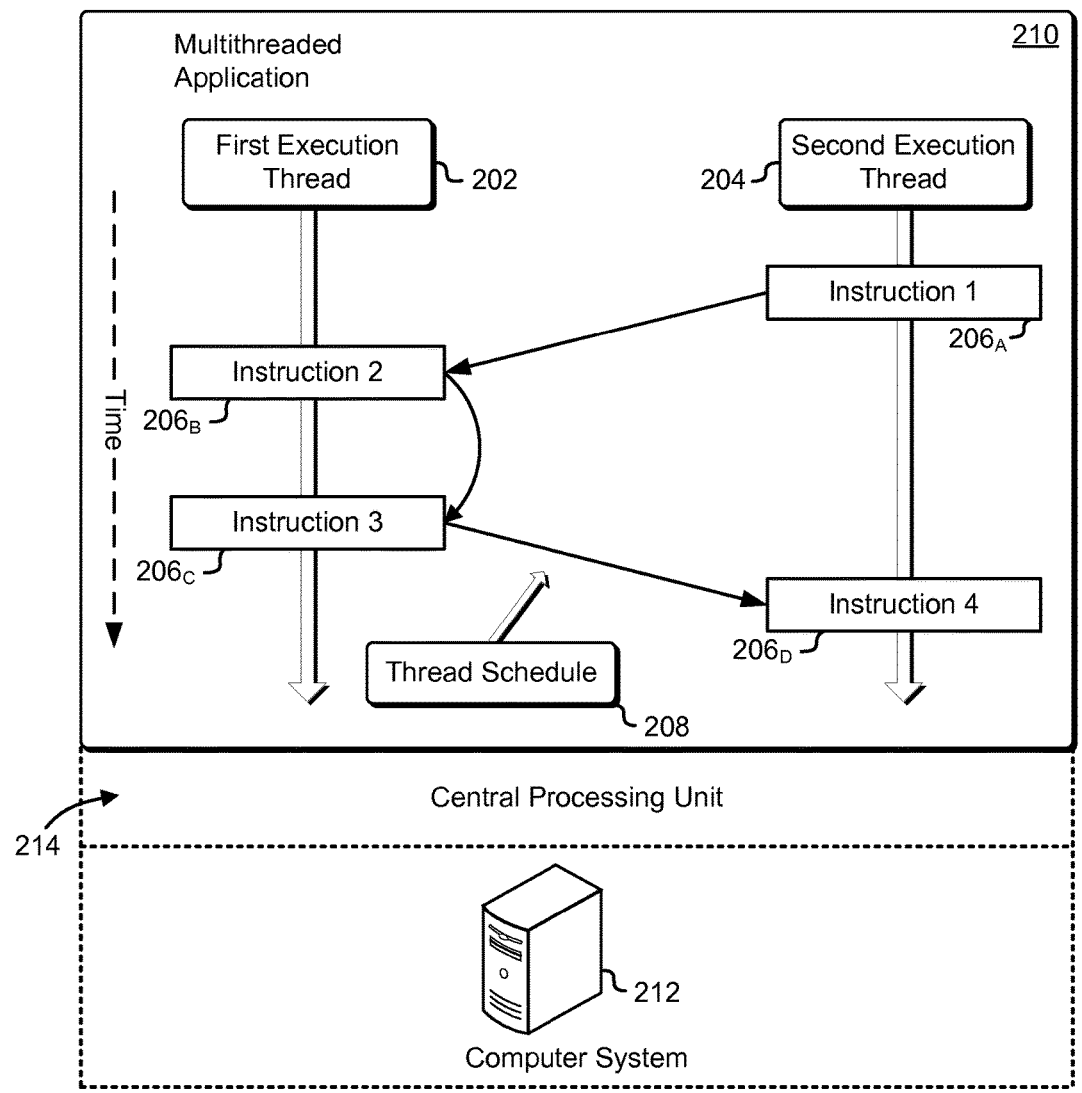
FIG. 2 shows an example of thread schedule-based execution of a multithreaded application in accordance with at least one embodiment.

FIG. 2 shows an example of thread schedule-based execution of a multithreaded application in accordance with at least one embodiment. A first execution thread 202 and a second execution thread 204 of a multithreaded application 210 are shown in FIG. 2. In addition, a plurality of instructions comprising a first instruction $206_A$ (denoted as instruction 1), a second instruction $206_B$ (denoted as instruction 2), a third instruction $206_C$ (denoted as instruction 3) and a fourth instruction $206_B$ (denoted as instruction 4) are provided to the first execution thread 202 and the second execution thread 204 for execution. As shown in FIG. 2, the first instruction $206_A$ and the third instruction $206_C$ are part of the first execution thread 202, whereas the second instruction $206_B$ and the third instruction $206_C$ (denoted as instruction 3) are part of the second execution thread 204. A thread schedule 208 is used to place constraints on the execution of the plurality of instructions (collectively referred to herein by the numeral alone).

The execution threads 202, 204 may be provided to an operating system (for example, a multitasking operating system) and may be executed using underling computing resources (for example, independently or concurrently). The computing resources may include computational and memory access resources, among others. For example, an operating system may provide multithreaded execution using an underlying single-core or multi-core central processing unit (CPU) or graphics processing unit (GPU). Further, some CPUs and GPUs may be configured to provide multithreading capability, whereby the architecture of the CPU or GPU may configured such that two or more execution threads are utilized for processing instructions. Whether underlying processor is single-threaded or multithreaded, an operating system running on the processor may utilize its architecture enable multithreaded execution of the application 210. Multithreaded execution is advantageous in that it permits efficient utilization computing resources for executing the application 210. Optimum utilization of the computing resources may be achieved by ensuring that the computing resources remain fully active during the processing of instructions. For example, if the first execution thread 202 processes a memory load instructions and becomes idle pending inherent memory access latency involved in obtaining data from memory, the second execution thread 204 may utilize idle computing resources to process another instruction.

The plurality of instructions 206 may be any type of instructions that require the utilization of computing resources for their fulfillment. For example, the instructions 206 may be arithmetic or logical operations, data handling or memory access operations or control flow operations, among others. For example, the instructions 206 may specify that data is to be read from or written to memory or a register. Further, the instructions 206 may specify addition, subtraction, multiplication, division, conjunction or disjunction operations, among others. In addition, the instructions 206 may be jump or branch instructions or stack operations, among others.

The thread schedule 208 may specify one or more constraints that may be placed on the execution of the first thread 202 or the second thread 204 by a central processing unit 214 of the computer system 212. In some embodiments, the thread schedule 208 may be a deterministic sequence of the execution of the first thread 202 and the second thread 204. For example, the thread schedule 208 may specify the timing or ordering of the execution of the plurality of instructions 206. Further, the thread schedule 208 may specify conditions for breaking away from the execution of an instruction. For example, a condition may be an expiration time associated with an instruction of the plurality of instructions 206 following which the execution of the instruction may be terminated. The thread schedule 208 may in some circumstances be narrowly tailored, whereby the schedule may specify the order of execution of the instructions 206 and the timing of their execution. In other cases, the thread schedule 208 may only place general limits on the execution of the threads 202, 204. For example, the thread schedule 208 may only specify when an execution break from a thread is permitted.

Figure 3:
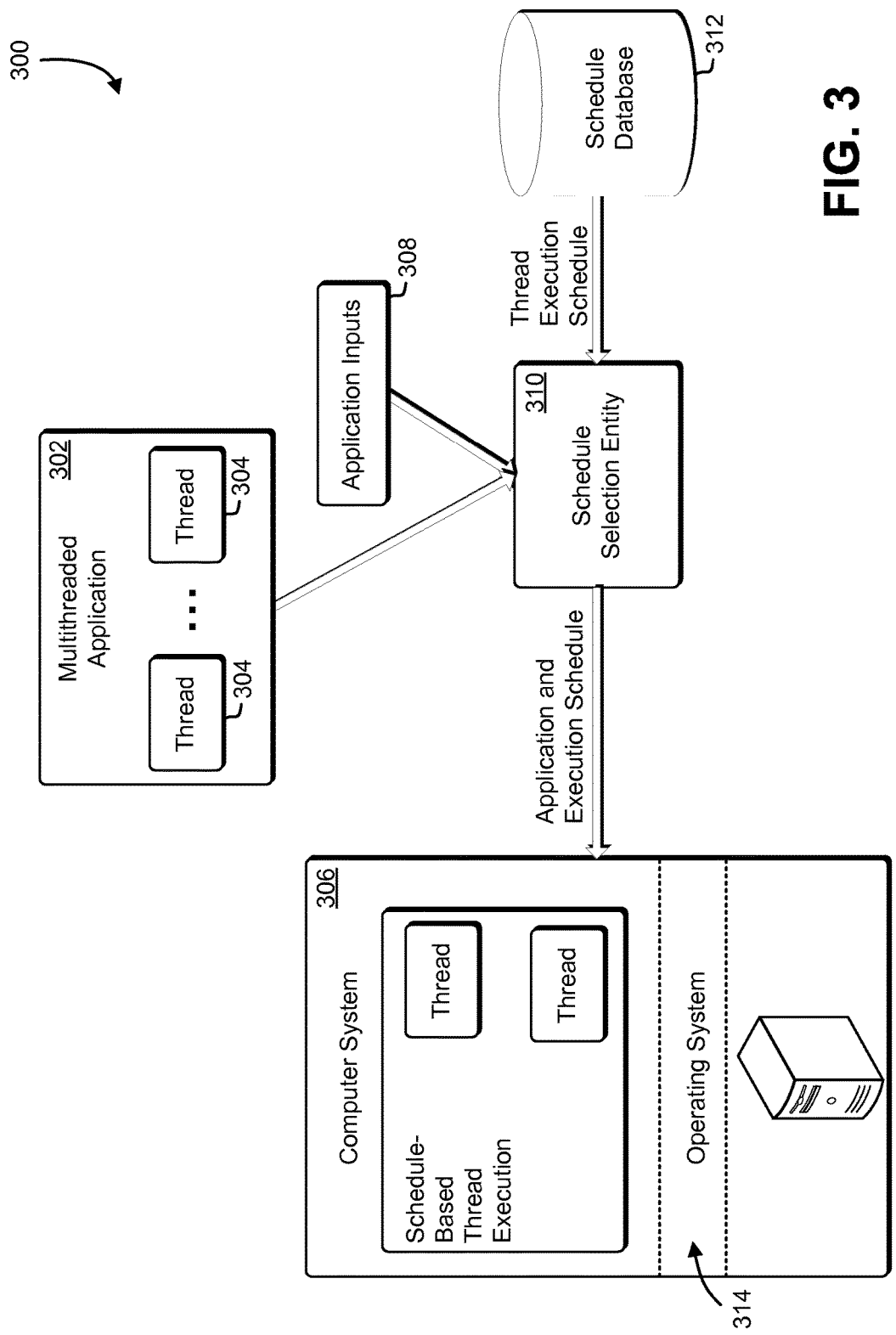
FIG. 3 shows an example of an environment for executing a multithreaded application based at least in part on an execution schedule in accordance with at least one embodiment described herein.

FIG. 3 shows an example of an environment for executing a multithreaded application based at least in part on an execution schedule in accordance with at least one embodiment. In the environment 300, a multithreaded application 302 having a plurality of execution threads 304 (singularly referred to herein as thread 304) is sought to be provided to a computer system 306 for processing. The computer system 306 may be a server or a host, among others, and may be equipped with an operating system 314. The execution of the application 306 may be based at least in part on one or more application inputs 308. The application inputs 308 may be any type of data that is utilized for the execution of the application 302. The application inputs 308 may be operand data that is used as an input to one or more instructions of the application 302. For example, the application 302 may be a word processing application, whereby a first thread 304 of the application 302 may include instructions that edit a document based at least in part on user input 308 and a second thread 304 may be instructions that are related to an auto-save feature of the application 302.

The manner of execution of the application 302 or associated threads 304 may be dependent upon the application inputs 308. For any one application, a change in the inputs 308 may result in a change in the performance of application execution. For example, the success or failure of the execution of the application as well as the speed of execution of the application may be a function of both the application inputs 308 and a thread schedule used to execute the application threads 304. Whereas one thread execution schedule may be optimum for a particular set of application inputs 308, the thread execution schedule may not be optimum for another set of inputs and another thread execution schedule may be optimum for the other set. Further, the performance of a thread execution schedule may be dependent upon hardware of an executing computer system. For example, the type of CPU, motherboard, network card, memory device (such as hard drive or solid state drive) or internal buses of the computer system may influence the performance of a thread execution schedule. Further, the thread execution schedule (as stored in a schedule database) may designated as being suitable for a particular type of computer system or particular hardware or software components thereof.

The application 302 or associated execution threads 304 are provided to a schedule selection entity 310. The schedule selection entity 310 may be any type of computing entity that is configured to receive information related to the multithreaded application 302 and the application inputs 308 and select a thread execution schedule for use in executing the multithreaded application 302. The schedule selection entity 310 may access a schedule database 312 that includes one or more thread execution schedules and select a thread execution schedule from the one or more thread execution schedules.

The schedule database 312 may further associate a thread execution schedule with an identity of an application and an identity of the inputs 308 to the application. In addition, a fitness measure as described herein may be retained. The fitness measure may a measure of the performance of the thread execution schedule when used for executing the identified application using the application inputs. For example, a high fitness measure may be indicative of favorable performance results that are observed when utilizing the schedule to execute the multithreaded application 302.

After selecting the execution schedule for the multithreaded application 302, the multithreaded application may be provided to the computer system 306 for execution using the selected execution schedule. The execution schedule may be provided to the operating system 314 for use in executing the multithreaded application 302. As described herein, the execution of the application in the computer system may be monitored and used to update the fitness measure associated with the thread execution schedule. For example, if the application is successfully executed, the fitness measure of the thread execution schedule may be update to positively bias using the thread execution schedule in executing the same application or similar applications or the same or similar inputs to the application and vice-versa. Furthermore, the speed of application execution may also be used to update the fitness measure, whereby if application that is executed expeditiously or promptly the fitness measure may be updated to favor using the thread execution schedule and vice-versa.

Figure 4:
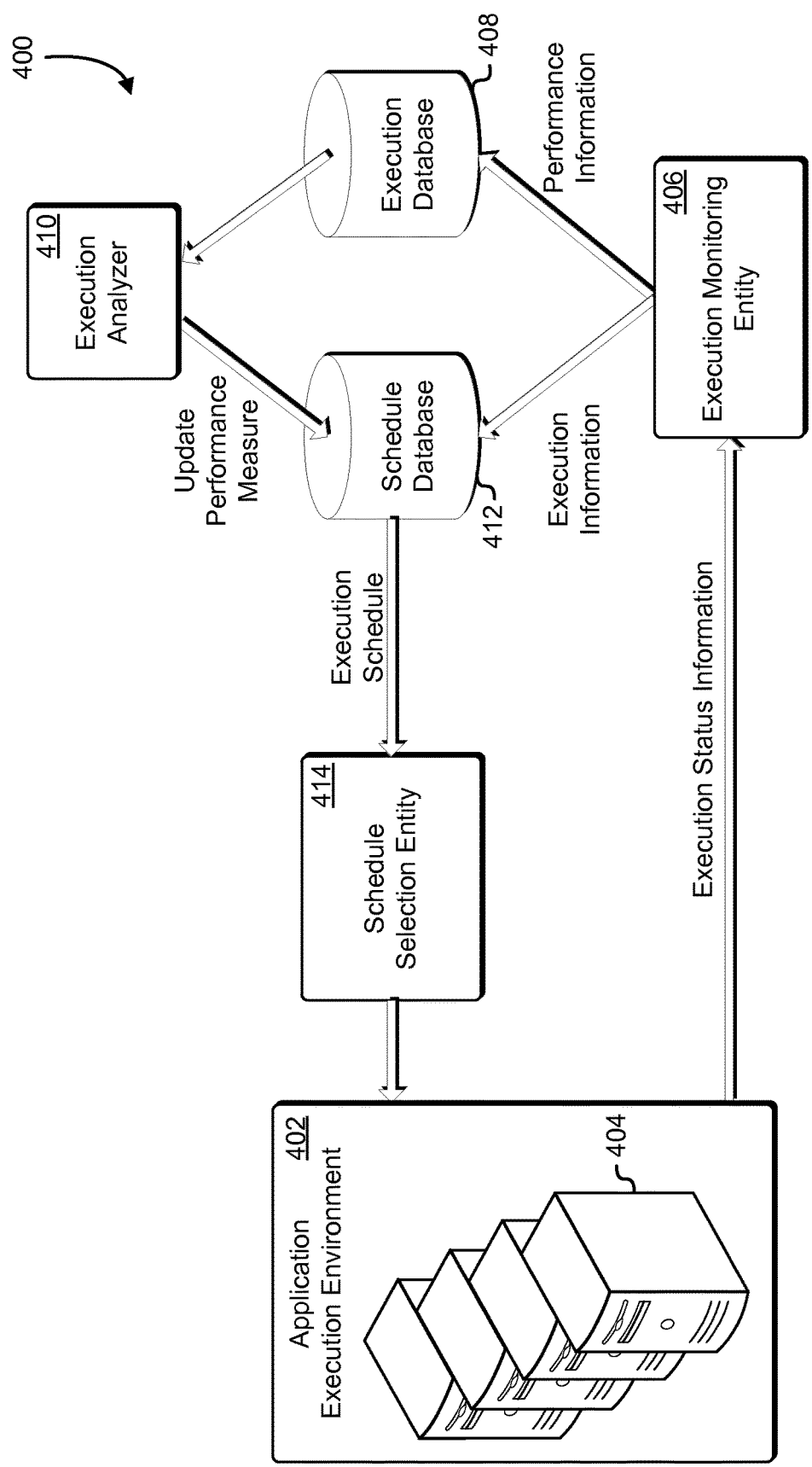
FIG. 4 shows an example of an environment for monitoring scheduled thread execution in accordance with at least one embodiment.

FIG. 4 shows an example of an environment for monitoring scheduled thread execution in accordance with at least one embodiment. The environment 400 includes an application execution environment 402 comprising a plurality of computer systems 404 (singularly referred to herein as computer system 404) that are utilized for executing a multithreaded application in accordance with an execution schedule. The application execution environment 402 may be a data center or a collection of servers or hosts, among others. The environment 400 also includes an execution monitoring entity 406 that is configured to receive, from the application execution environment 402, information indicative of the status or state of execution of the multithreaded application on a computer system 404, whereby the execution monitoring entity 406 may update an execution database 408 based at least in part on the received information. An execution analyzer 410 may retrieve information from the execution database 408 and utilize it to update a schedule database 412 as described herein, whereby the schedule database 412 is accessible by a schedule selection entity 414 for selecting a thread execution schedule for application as described with reference to FIG. 3 herein.

Although the application execution environment 402 is shown as comprising a plurality of computer systems 404, the application execution environment 402 may include only one computer system, whereby application execution may be monitored on the one computer system. As described herein, it may be advantageous to have a large sample size of monitored application executions due at least in part to the fact that having the large sample size results in more accurate analysis of the effectiveness or fitness of the use of the thread schedule in executing a particular application with a particular input. Because differences between computer systems may cause different execution behaviors for an application, it may be advantageous to have similarly configured computer systems 404 in the application execution environment 402. Similarly configured computer systems 404 may be computers, servers or hosts that are running the same operating system or software applications. Further, the computer systems 404 may have the same hardware including CPUs, memory devices, network cards or motherboards, among others. When controlling for variations in hardware or software in the application execution environment 402, the observed application execution performance or differences in the performance may be more justifiably attributed to an execution schedule rather than environmental factors or differences between configurations of computer systems within the application execution environment 402.

The execution monitoring entity 406 may receive status information associated with the execution of an application in the application execution environment 402. The status information may include execution information of the application as well as performance information related to the execution. The execution information may be usable to trace application execution in a computer system 404 of the application execution environment 402. The execution information may indicate the stages of the execution of the application and the ordering of execution of instructions (or threads). Further, the execution information may indicate when transitioning or switching between thread execution is performed. If the execution of the multithreaded application is performed in accordance with a deterministic order, the execution information may be usable to identify the order.

In various embodiments, the schedule selection entity described with reference to numeral 310 may cause the multithreaded application to be assigned an execution schedule that allows an executing computer system latitude or freedom in determining the execution sequence of the multithreaded application. The schedule may be assigned due at least in part to the fact that the schedule database does not retain a more deterministic execution schedule for the application or its associated inputs. Or alternatively, a retained execution schedule may not be used because it has a low fitness measure. Further, as the schedule database is constructed or "built up" to include usable execution schedule, initially assigned execution schedules may allow more latitude to the computer system in assigning instruction execution sequences or thread switching. Further, the execution performance may be monitored to determine their fitness to the application or associated inputs.

The performance information received by the execution monitoring entity 406 may include indications of whether one or more instructions of the application were successfully executed. In addition, the performance information may include a measure of time (for example, CPU clock cycles) that was required to complete the execution. Further, the performance information may include an indication of whether an execution of an instruction was aborted or whether a "break" was performed, whereby the execution of a thread or an instruction thereof was terminated to cause another instruction to be executed. The performance information may be usable to identify any favorable execution results or performance penalties associated with an execution schedule.

To execution monitoring entity 406 may receive the execution information and the performance information from a computer system 404 executing the application. The execution monitoring entity 406 may communicate with a thread switching function of an operating system to obtain the execution information and the performance information. Further, a driver or kernel of the computer system 404 may be configured to provide the execution information and the performance information to the execution monitoring entity 406. Further, the execution monitoring entity 406 may query the computer system 404 to obtain the execution information and the performance information.

The execution monitoring entity 406 provides the execution information to the schedule database 412. For example, the execution information may supplement information retained by the schedule database 412 regarding the execution schedule of the application. For example, the execution information may provide further details about the instruction execution ordering or thread switching employed by the computer system 304 in executing the application. In some embodiments, if the ordering of instruction execution and thread switching is not constrained by the assigned execution schedule, the execution information may provide this information to the schedule database 412 for use, along with performance information, in fine-tuning future assignment of execution schedules.

The execution monitoring entity 406 also provides the performance information to the execution database 414. The performance information retained by the execution database 414 may be accessible by the execution analyzer 410. The execution analyzer 410 may use the performance information to compute a fitness measure for the thread schedule used for executing the application or update an existing fitness measure. As described herein, expeditious execution of the application or one or more associated instructions may be a positive consideration. However, failures to execute one or more instructions may result in updating the fitness measure such that use of the execution schedule or portion thereof is disfavored. Varying magnitudes may be associated with various observed execution performances. For example, an observed failure to execute an instruction of an application may be weighed more heavily than an observed expeditious execution of another instruction of the application.

The execution analyzer 410 may also update the fitness measure of an application depending on the breadth of application inputs with which the thread schedule is observed to perform favorably. For example, a first thread schedule that is observed to perform favorably with a large set of application inputs may have a higher fitness measure than a second thread schedule that is observed to perform favorably with a smaller set of application inputs. The execution analyzer 410 may provide the determined fitness measure to the schedule database 412, whereby the schedule database 412 may retain the fitness measure together with an identity associated with the execution application, an identity associated with application inputs and an identity associated with the utilized execution schedule.

The schedule selection entity 414 may utilize the retained identities to determine whether the thread execution schedule may be assigned to a received application. If a positive determination is made, the schedule selection entity 414 may determine based at least in part on the fitness measure whether the thread execution schedule is suitable for the received application. For example, a range of values or categories for the fitness measure may be indicative that the thread execution schedule may be used for application execution. Conversely, if the schedule selection entity 414 determines that an optimum execution schedule is not available, the schedule selection entity 414 may enable free threading for application execution, whereby an assigned thread schedule may not constrain thread switching or instruction execution ordering. The computer system 404 tasked with application execution or an operating system thereof may be responsible for determining appropriate instruction execution ordering or thread switching, among other execution constraints. As described herein, the execution of a free-threaded application may be monitored to update the schedule database 412.

Furthermore, the schedule selection entity 414 may mutate execution schedules or execution schedules and free threading to enable discovery thread schedules deemed optimum (for example, thread schedules having high fitness measures). For example, if a thread schedule having a favorable fitness measure is not found, the schedule selection entity 414 may be configured to experimentally perform thread schedule discovery. Portions of a plurality of thread schedules may be combined (by concatenating or "piecing together" the portions of plurality of thread schedules) to arrive at a new thread schedule whose execution may be monitored. Such techniques may be particularly desirable when receiving an application or application inputs that lack a history of prior thread-scheduled executions.

Two modes of operation may be associated with the execution monitoring entity 406. In a first mode of operation, the execution monitoring entity 406 may update the execution database 408 with performance information of an execution schedule assigned by the schedule selection entity 414. The performance information may be used to maintain a fitness measure associated with the execution schedule. Because the execution schedule was assigned by the schedule selection entity 414, the schedule database 412 may not be required to be updated with execution information. In a second mode of operation, free threading may be used for which the schedule database 412 may not maintain an associated execution schedule. Accordingly, the execution monitoring entity 406 may update the schedule database 412 with execution information and the execution database 408 with performance information.

Figure 5:
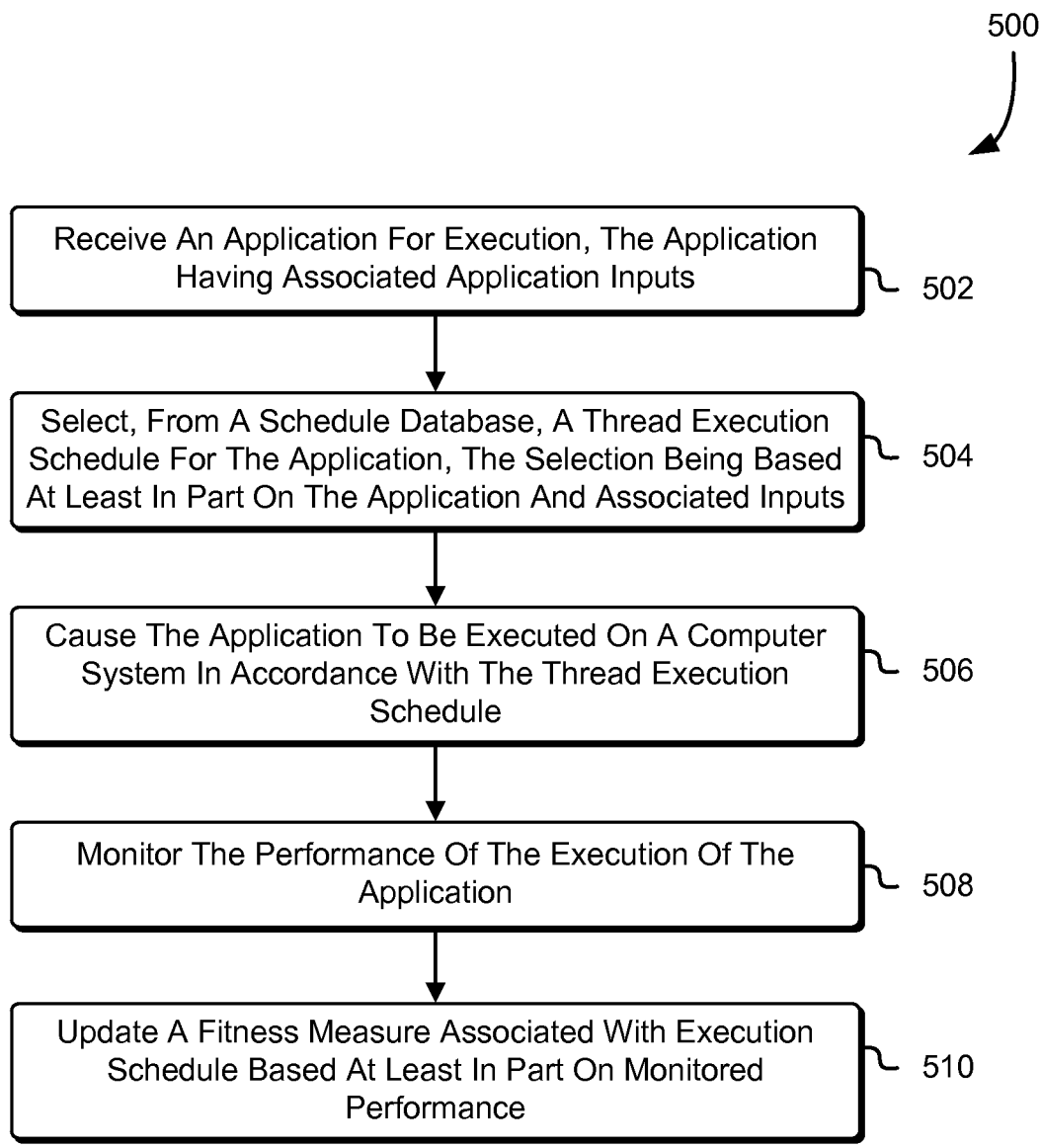
FIG. 5 shows an example of a method for updating a fitness measure associated with a thread execution schedule in accordance with at least one embodiment.

FIG. 5 shows an example of a method for updating a fitness measure associated with a thread execution schedule in accordance with at least one embodiment. In the process 500, a schedule selection entity, such as the schedule selection entity described with reference to numeral 310 in FIG. 3, receives 502 an application for execution, whereby the application has associated application inputs. The schedule selection entity then selects 504 a thread execution schedule for the application from a schedule database. Selecting the thread execution schedule may be based at least in part on the application and associated inputs. For example, the schedule selection entity may assess the fitness measures of a plurality of thread schedules being indicated as suitable for the application and associated inputs, and the schedule selection entity may select a thread schedule having fitness measure that may be categorized as being well performing. The thread execution schedule may be indicated as being usable for executing the application having the associated application inputs if the thread execution schedule has been previously used for execution of the application having the associated application inputs. Further, the thread execution schedule may be usable for executing the application even if experimental assignment (for example, for the first time) of a thread execution schedule to the application is performed.

Selection of a thread schedule from a plurality of thread schedules for a particular application and application inputs may be performed off-line in order to reduce run-time processing. The off-line selection may be used to populate a database of best-fit thread schedules, whereby, each application and inputs pair may have a best-fit thread schedule in the database. Upon receiving a request for a thread schedule for an application and associated inputs, the best-fit thread schedule may be retrieved from the database. Off-line, however, the schedule database may be analyzed to select the best-fit thread schedule from the plurality of schedules retained in the schedule database.

The schedule selection entity then causes 506 the application to be executed on a computer system in accordance with thread execution schedule. For example, the schedule selection entity may generate computer-executable instructions that cause the application to follow the thread execution schedule. An execution monitoring entity, such as the execution monitoring entity described with reference to numeral 406 in FIG. 4, monitors 510 the performance of the execution of the application. Monitoring the performance may include identifying whether instructions of the application were successfully executed as well as identifying an execution time of the instructions.

Following performance monitoring, an entity, such as an execution analyzer described with reference to numeral 410 in FIG. 4, updates 510 a fitness measure associated with the execution schedule. For example, the fitness measure of a thread execution schedule that causes the computer system to malfunction or "crash" may be updated to negatively bias against future use of the thread execution schedule. Conversely, the fitness measure of a thread execution schedule that cause the application to be executed expeditiously may be updated to bias in favor of future use of the thread execution schedule.

Figure 6:
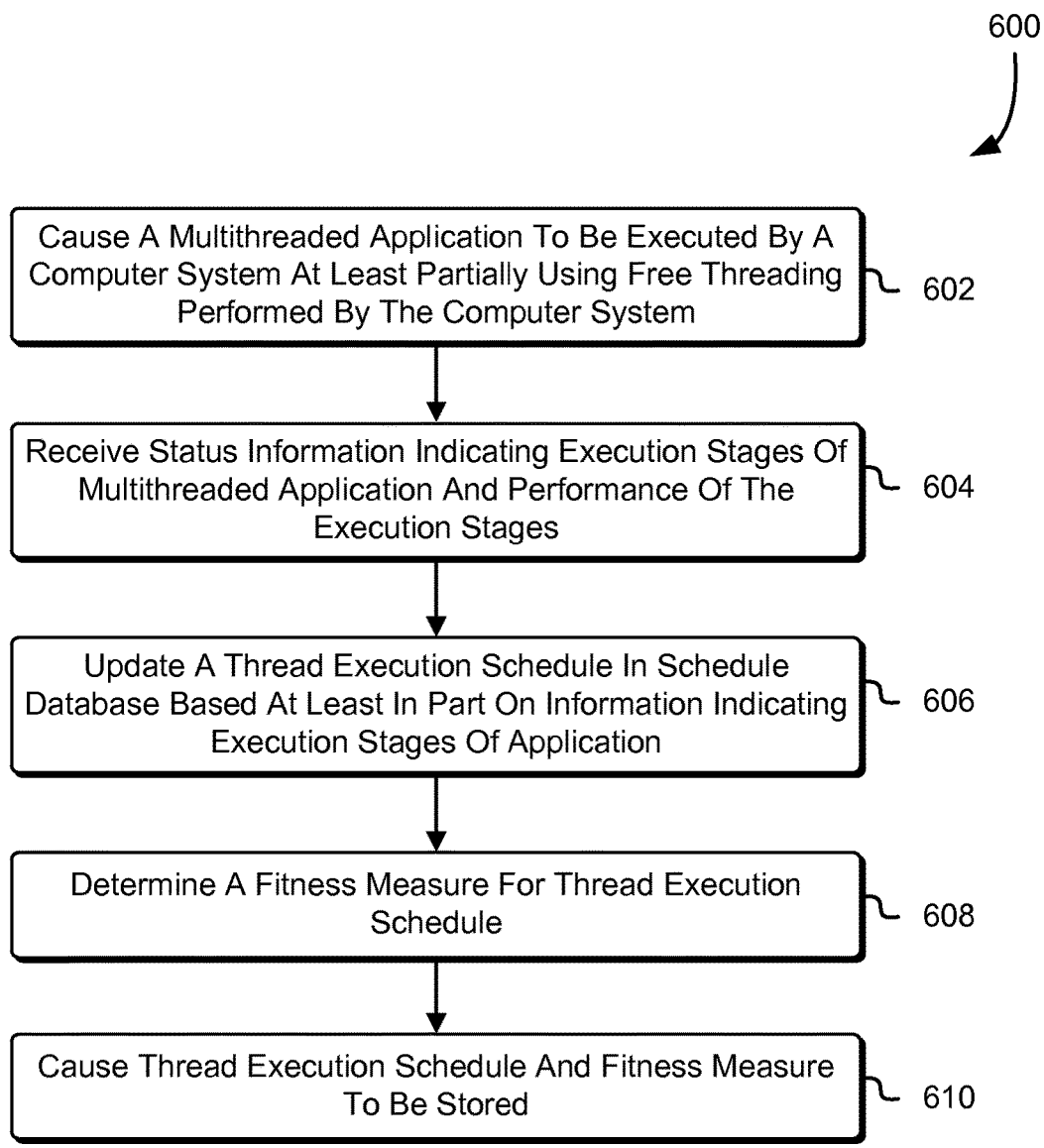
FIG. 6 shows an example of a method for updating schedule database in accordance with at least one embodiment.

FIG. 6 shows an example of a method for updating schedule database in accordance with at least one embodiment. In the process 600, a schedule selection entity, such as the schedule selection entity described with reference to numeral 310 in FIG. 3, causes 602 a multithreaded application to be executed by a computer system at least partially using free threading performed by the computer system. Various computer system CPUs and operating system may be natively configured to formulate a thread execution schedule for applications. For example, the thread execution schedule may be based at least in part on thread priorities. In addition, execution conditions may dictate the schedule of execution of an application. For example, if an instruction of a thread requires an extended period of time to be executed, the computer system may cause execution to switch to another thread. Further, various interrupts may contribute to thread switching. The schedule selection entity may enable free threading by the computer system executing the application to experimentally discover alternative or additional execution schedules to those retained in the schedule database.

An execution monitoring entity, such as the execution monitoring entity described with reference to numeral 406 in FIG. 4, receives 604 status information indicating the execution stages of the multithreaded application and the performance of the execution stages. The execution stages of the multithreaded application may be one or more thread context switches that occurred during the execution of the multithreaded application. Further, each thread context switch may be associated with a list of one or more instructions that were executed for a thread. The execution stages may indicate a length of time that was required for executing the one or more instructions as well as a length of time for which the one or more instructions were maximally scheduled. The status information indicating the execution stages of the multithreaded application may be used to determine whether the execution of the one or more instructions concluded prior to the maximum amount of time allocated for execution of the instructions. For example, the execution monitoring entity may receive information indicating the ordering of executing of instructions and the manner in which thread switching was performed. The execution monitoring entity then updates 606 a thread execution schedule in schedule database, such as the schedule database described with reference to numeral 412 in FIG. 2, based at least in part on the received information indicating execution stages of the application. Accordingly, the schedule database may be updated with detailed information indicative of thread transitioning and execution ordering selected by the executing computer system or an operating system thereof.

An execution analyzer, such the execution analyzer 410 described with reference to numeral 410 in FIG. 4, determines 608 a fitness measure for thread execution schedule. As described herein, the fitness measure may be based at least in part on performance factors associated with the execution schedule. Further, the execution analyzer causes 610 the thread execution schedule and fitness measure to be stored. As described herein, the fitness measure may apply to similarly configured computer systems. For example, the fitness measure may not as accurately reflect the expected performance of the execution of the application on a different computer system. Further, the fitness measure may be application to various versions of the same application. However, in some circumstances, the various versions may be configured to execute differently and may be associated with different fitness measures.

Figure 7:
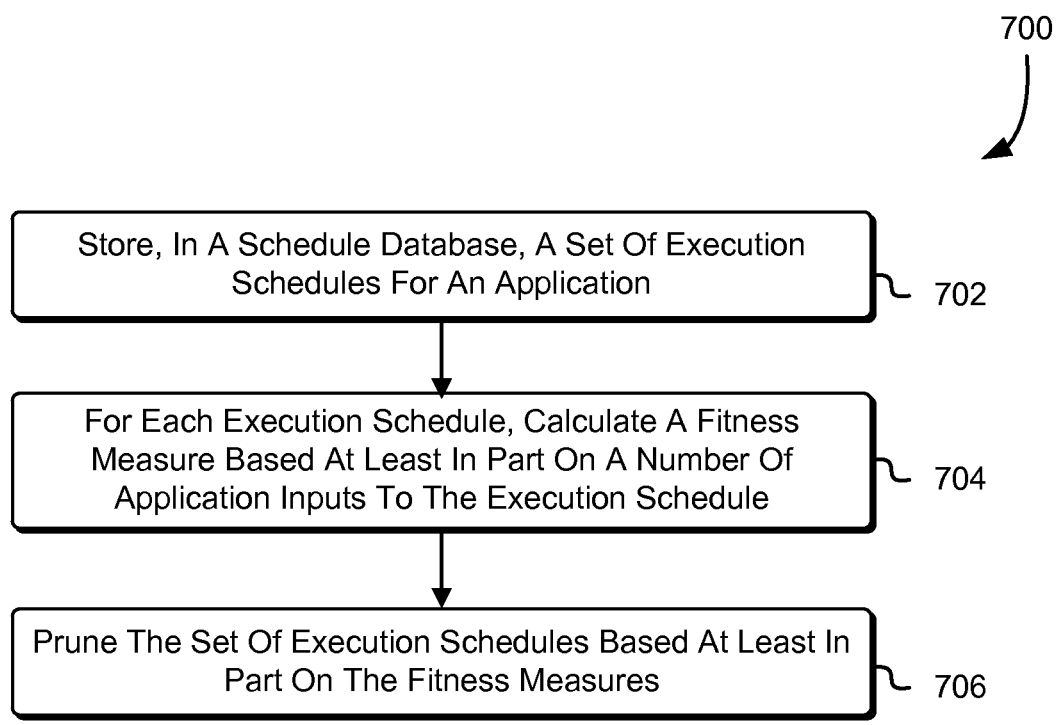
FIG. 7 shows an example of a method for schedule database pruning in accordance with at least one embodiment.

FIG. 7 shows an example of a method for schedule database pruning in accordance with at least one embodiment. In the process 700, an entity, such as the schedule database described with reference to numeral 412 in FIG. 4 or the execution analyzer described with reference to numeral 410 in FIG. 4, stores 702 a set of execution schedules for an application. Further, an entity, such as the execution analyzer described with reference to numeral 410 in FIG. 4, calculates 704, for each execution schedule, a fitness measure based at least in part on a number of application inputs to the execution schedule. As described herein, the fitness measure may also be based at least in part on execution performance of the execution schedule. The fitness measure may be calculated based at least in part on a size of a set of application inputs for which the execution schedule is observed to perform favorably (for example, as evidenced by successful execution of application threads).

The entity then prunes 704 the set of execution schedules based at least in part on the fitness measures. As the schedule database grows in size due to the addition of execution schedules, it is desirable to reduce the size of the schedule database. An execution schedule for a particular application and application input pair may be discarded using the pruning. For example, if the fitness measure is a numeric value reflecting the performance of the execution schedule, execution schedules having values below a threshold may be discarded. Further, as an alternative to discarding an execution schedule, the execution schedule may be associated with a reduced set of inputs or the execution schedule may be retained in a database but may not be associated with or assigned to a particular set of inputs or a particular application. Furthermore, randomization may be utilized in the pruning. For example, for an application and application inputs pair, a randomly generated value may be added to the fitness measures of stored execution schedules. An execution schedule may be discarded on a condition that the aggregate of the random value and the fitness measure is within a particular range. Further, other iterative techniques may be used to prune the set of execution schedules. Pruning the set of execution schedules causes a size of the set of execution schedules to be reduced.

The schedule database may include a plurality of execution schedules for given application inputs and the number of categories of application inputs may become large. To reduce the size of the schedule database, commonalities between the application inputs may be determined and the categories of application inputs. For example, categories of application having small differences (for example, a difference of one or two bits) may be combined. The combination may be performed due to the fact that a well performing execution schedule for a particular application input may also be expected to be well performing for a slightly variant application input.

The constraints enforced by a thread execution schedule may vary in scope. In some instances, the thread execution schedule may provide a deterministic sequence for execution the instructions of a plurality of threads of a multithreaded application. In others, however, the thread execution schedule may specify softer limits on multithreaded application execution including conditions dictating permissible thread switching. The computer system executing the multithreaded application or an operating system thereof may be configured with techniques and algorithms for executing multithreaded applications that supplement the thread execution schedule.

In various embodiments, a multithreaded application may have a large number of execution threads (for example, 128 threads) that may be executed on multicore CPU. As the number of execution threads and computer system CPUs grows, the complexity of the thread execution schedule also grows. To simplify thread execution schedules, a partial thread execution schedule may be used, whereby the partial thread execution schedule is applicable to a subset of application threads that are mapped to a subset of CPUs. A plurality of partial thread execution schedules may be for the plurality of subsets of application threads instead of one complex thread execution schedule.

Figure 8:
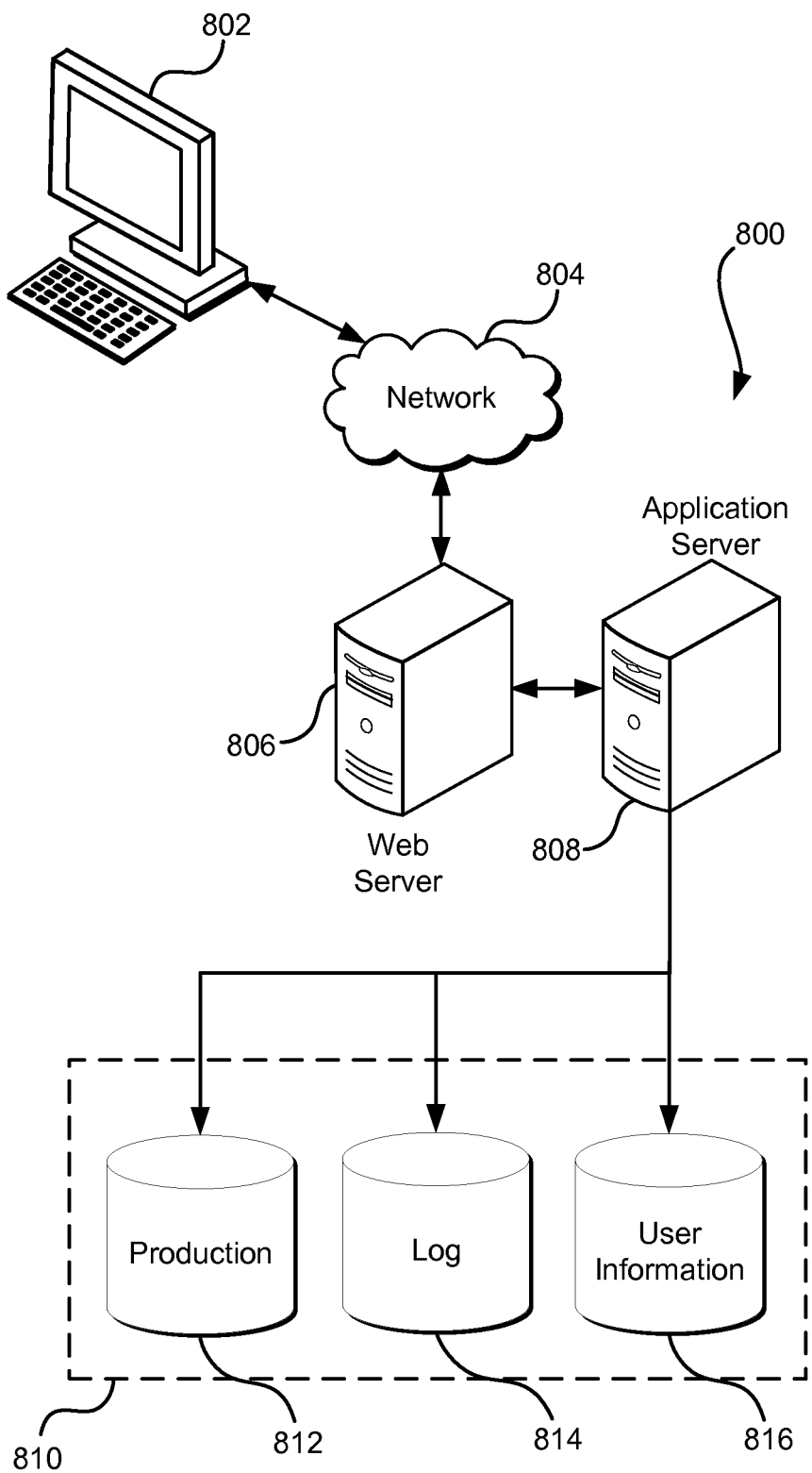
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for executing multithreaded applications, comprising:
    under the control of one or more computer systems configured with executable instructions,
        receiving application input information for a multithreaded application having a plurality of execution threads, the application input information being data used in executing the multithreaded application;
        accessing a schedule database including a plurality of thread execution schedules associated with the multithreaded application, a thread execution schedule of the plurality of thread execution schedules specifying one or more conditions placed on the execution of the multithreaded application, the one or more conditions indicating a thread switch in executing the plurality of execution threads, wherein the schedule database is populated with at least one thread execution schedule by enabling free threading of an application by an executing computer system and monitoring execution of the application to produce at least a portion of the least one thread execution schedule;
        selecting, based at least in part on the application input information, a thread execution schedule of the plurality of thread execution schedules for executing the multithreaded application;
        causing the multithreaded application to be executed by a computer system in accordance with the selected thread execution schedule;
        receiving execution status information of the multithreaded application from the computer system; and
        storing the received execution status information.

2. The computer-implemented method of claim 1, wherein the execution status information includes an indication of whether one or more instructions of the multithreaded application were successfully executed or an indication of an execution time of the one or more instructions.

3. The computer-implemented method of claim 2, further comprising
    calculating a fitness score for the thread execution schedule based at least in part on the execution status information.

4. The computer-implemented method of claim 1, further comprising: pruning the schedule database based at least in part on a plurality of fitness measures associated with the plurality of thread execution schedules.

5. The computer-implemented method of claim 4, wherein pruning the schedule database further includes changing an association between at least one thread execution schedule of the plurality of thread execution schedules and the multithreaded application.

6. A system, comprising at least one computing device implementing one or more services, wherein the one or more services:

select, from a plurality of thread execution schedules, a thread execution schedule for executing an application, the application having a plurality of execution threads, the selection being based at least in part on an identity associated with the application and an identity associated with one or more inputs to the application, the plurality of thread execution schedules maintained in a schedule database and the schedule database being populated with at least one thread execution schedule by enabling free threading of the application by an executing computer system and monitoring execution of the application to produce at least a portion of the least one thread execution schedule;

cause the application to be executed in accordance with the thread execution schedule; and store execution status information as a result of execution of the application.

7. The system of claim 6, wherein the plurality of thread execution schedules are identified as being usable for execution of the application having the one or more inputs.

8. The system of claim 6, wherein the schedule database is populated with at least one thread execution schedule by mutating one or more existing thread execution schedules to produce at least a portion of the least one thread execution schedule.

9. The system of claim 8, wherein mutating the one or more existing thread execution schedules further includes combining a portion from each existing thread execution schedule of the one or more existing thread execution schedules.

10. The system of claim 6, wherein the one or more services further:

calculate a fitness measure for the thread execution schedule based at least in part on the execution status information; and prune the plurality of thread execution schedules based at least in part on the calculated fitness measure.

11. The system of claim 10, wherein pruning the plurality of thread execution schedules further includes changing an association between a first thread execution schedule of the plurality of thread execution schedules and the identity associated with the application or changing an association between the first thread execution schedule of the plurality of thread execution schedules and the identity associated with the one or more inputs to the application.

12. The system of claim 6, wherein monitoring execution of the application further includes determining one or more instructions of the plurality of execution threads were successfully executed of the application.

13. The system of claim 6, wherein monitoring execution of the application further includes determining an execution time of one or more instructions a plurality of execution threads of the application.

14. A non-transitory computer-readable storage medium having stored thereon executable instructions that, when executed by one or more processors of a computer system, cause the computer system to at least:

select, from a schedule database, a thread execution schedule based at least in part on a fitness measure associated with the thread execution schedule, wherein the schedule database is populated with at least one thread execution schedule by enabling free threading of an application by an executing computer system and monitoring execution of the application to produce at least a portion of the least one thread execution schedule;

cause a multithreaded application to be executed in accordance with the thread execution schedule;

monitor the execution of the multithreaded application; and update the schedule database in accordance with the monitored execution of the multithreaded application.

15. The non-transitory computer-readable storage medium of claim 14, wherein the instructions that cause the computer system to monitor the execution of the multithreaded application further include instructions that cause the computer system to receive information indicative of whether at least a portion of the application was successfully executed.

16. The non-transitory computer-readable storage medium of claim 14, wherein the instructions that cause the computer system to update the schedule database in accordance with the monitored execution of the application further include instructions that cause the computer system to update the fitness measure of the thread execution schedule.

17. The non-transitory computer-readable storage medium of claim 14, wherein the instructions that cause the computer system to select the thread execution schedule further include instructions that cause the computer system to select the thread execution schedule based at least in part on an identity associated with the multithreaded application or an identity associated with inputs to the multithreaded application.

18. The non-transitory computer-readable storage medium of claim 14, wherein the instructions further comprise instructions that, when executed by the one or more processors, cause the computer system to evaluate a plurality of thread execution schedules stored in the schedule database to identify one or more thread execution schedules to be discarded based at least in part on associated fitness measures.

19. The non-transitory computer-readable storage medium of claim 14, wherein the instructions further comprise instructions that, when executed by the one or more processors, cause the computer system to populate the schedule database with one or more thread execution schedules by mutating one or more stored thread execution schedules or monitoring free-threaded execution of an application.

20. The non-transitory computer-readable storage medium of claim 14, wherein the thread execution schedule specifies an ordering of execution of instructions of the multithreaded application.

* * * * *